(12) United States Patent
Barcia et al.

(10) Patent No.: US 8,819,650 B2
(45) Date of Patent: *Aug. 26, 2014

(54) INSTANTIATING AN INTERFACE OR ABSTRACT CLASS IN APPLICATION CODE

(75) Inventors: Roland Barcia, Leonia, NJ (US); Kulvir S. Bhogal, Pflugerville, TX (US); Geoffrey M. Hambrick, Round Rock, TX (US); Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 149 days.

This patent is subject to a terminal disclaimer.

(21) Appl. No.: 13/468,142

(22) Filed: May 10, 2012

(65) Prior Publication Data

US 2012/0222022 A1    Aug. 30, 2012

Related U.S. Application Data

(63) Continuation of application No. 11/551,892, filed on Oct. 23, 2006, now Pat. No. 8,214,811.

(51) Int. Cl.
     *G06F 9/45*      (2006.01)

(52) U.S. Cl.
     USPC ........................................................ 717/147

(58) Field of Classification Search
     USPC ........... 719/331; 707/791; 717/108–109, 116, 717/129, 136, 140, 147
     IPC ............................................... G06F 8/54,8/315
     See application file for complete search history.

(56) References Cited

U.S. PATENT DOCUMENTS

| | | | |
|---|---|---|---|
| 6,029,207 A | 2/2000 | Heninger | |
| 6,430,569 B1 | 8/2002 | Bracha et al. | |
| 6,578,090 B1 | 6/2003 | Motoyama et al. | |
| 7,318,215 B1 | 1/2008 | Krishnana et al. | |
| 7,356,803 B2 * | 4/2008 | Bau et al. | 717/116 |
| 7,562,342 B2 | 7/2009 | Berg et al. | |
| 7,716,246 B2 * | 5/2010 | Pepin | 707/791 |
| 7,827,527 B1 * | 11/2010 | Chiluvuri | 717/109 |
| 2002/0138763 A1 | 9/2002 | Delany et al. | |
| 2003/0177477 A1 | 9/2003 | Fuchs | |
| 2006/0225053 A1 * | 10/2006 | Lakshman et al. | 717/140 |
| 2008/0127070 A1 | 5/2008 | Barcia et al. | |

OTHER PUBLICATIONS

U.S. Appl. No. 11/551,892.

\* cited by examiner

*Primary Examiner* — Tuan A Vu
(74) *Attorney, Agent, or Firm* — Stephen J. Walder, Jr.; David A. Mims, Jr.

(57) ABSTRACT

Mechanisms for instantiating an interface or abstract class in application code are provided. An object-oriented programming language is extended such that interfaces and abstract classes can be instantiated in application code without a concrete class specified. Metadata is defined which maps each interface or abstract class instantiation in the application code to a concrete class to be used either by the compiler at build time, or the virtual machine at runtime. Once the appropriate concrete class is determined from the metadata, the class is instantiated with a conventional class loader. The metadata may be provided, for example, as a separate file, such as a markup language file, defined with a virtual machine switch, as annotations in the application code, or the like.

24 Claims, 5 Drawing Sheets

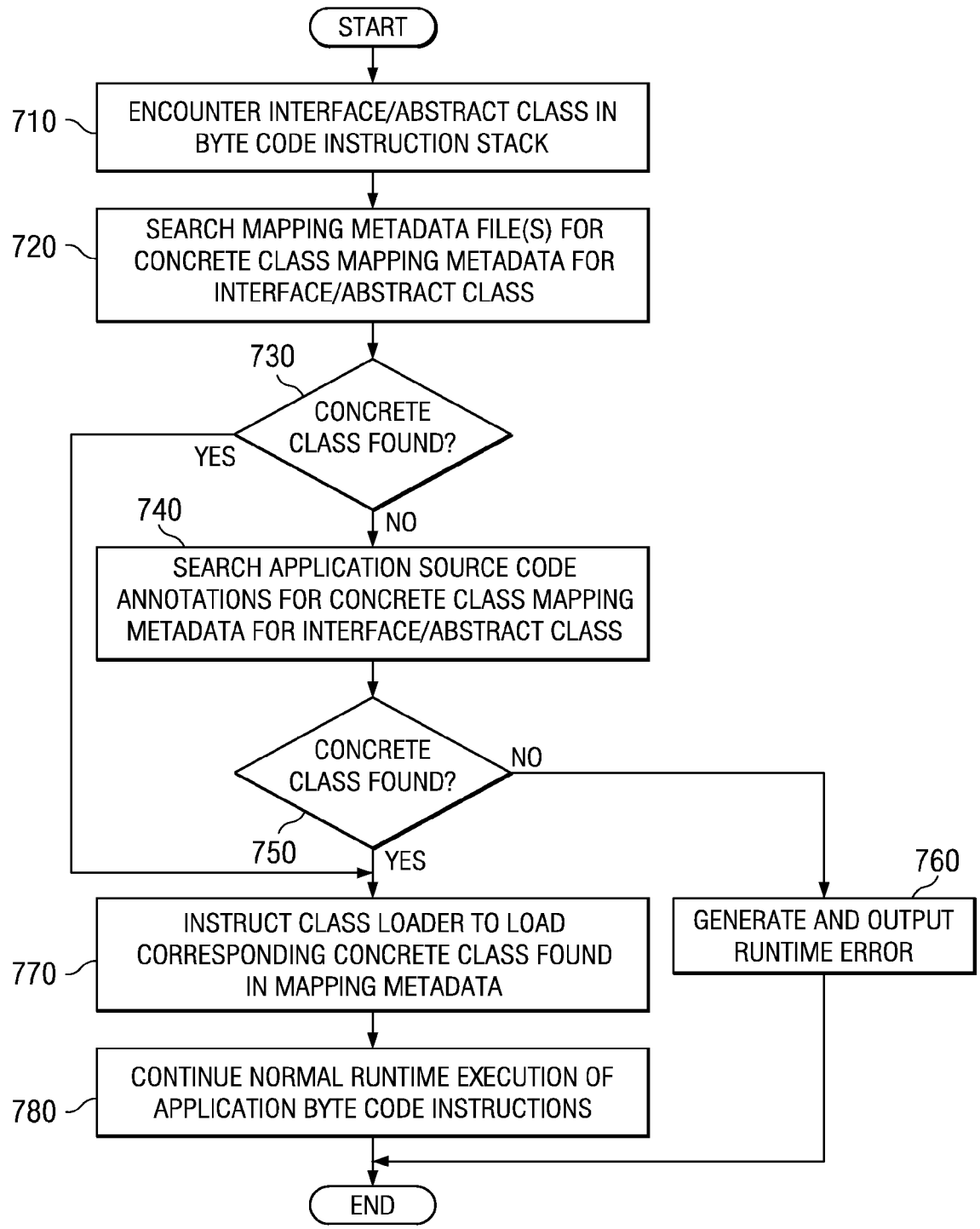

INSTANTIATING AN INTERFACE OR ABSTRACT CLASS IN APPLICATION CODE

This application is a continuation of application number 11/551,892, filed Oct. 23, 2006, now U.S. Pat. No. 8,214,811 status allowed.

BACKGROUND

1. Technical Field

The present application relates generally to an improved data processing system and method. More specifically, the present application is directed to a system and method for instantiating an interface or abstract class in application code.

2. Description of Related Art

In object-oriented programming, classes are used to group related variables and functions. A class describes a collection of encapsulated instance variables and methods (functions), possibly with implementation of those types together with a constructor function that can be used to create objects of the class.

A class is a cohesive package that consists of a particular kind of compile-time metadata. A class describes the rules by which objects, i.e. instances of the class, behave. The class specifies the structure of data which each instance of the class, i.e. an object, contains as well as the methods which manipulate the data of the object and perform tasks. A method is a function with a special property that it has access to data stored in an object.

Instances of a class, i.e. objects, will have certain aspects, i.e. features, attributes or properties, in common. One of the benefits of programming with classes is that all instances of a particular class will follow the defined behavior of the class they instantiate.

A class can "implement" (or "realize") multiple interfaces, each of which specify one or more abstract method signatures (name and type of the method and its parameters) which must be defined in that class. Unlike multiple inheritance where actual code is inherited (along with naming and logical conflicts) interfacing allows one to define a behavior-interface (methods) that all classes implementing the interface should be able to fulfill.

Interfaces are a type of abstract class. Abstract classes, or abstract base classes (ABCs), are classes that are designed only as a parent class and from which child classes may be derived, and which is not itself suitable for instantiation. Concrete classes, on the other hand, are classes for which instances, i.e. objects, may be created. Abstract classes are often used to represent abstract concepts or entities. The incomplete features of the abstract class are then shared by a group of sibling sub-classes which add different variations of the missing pieces.

Interfaces and abstract classes allow for separation of concerns and inter-operability when architecting and developing applications. The interfaces and abstract classes must be implemented in concrete classes when generating such applications. Such implementation of interfaces and abstract classes requires "hard coding" of the interface or abstract class implementation in the concrete class. As a result, if the interface or abstract class implementation is to be replaced, a source code update and recompilation would be necessary.

Consider the following example where an AudioDevice interface is provided and two concrete classes "Radio" and "MP3Player" implementing the AudioDevice interface are provided:

```
public interface AudioDevice {
    public void play( ) throws playbackException;
    public void stop( ) throws discontinuationException;
}
public class Radio implements AudioDevice {
    public void play( ) throws playbackException {...}
    public void stop( ) throws discontinuationException{...}
}
public class MP3Player implements AudioDevice {
    public void play( ) throws playbackException{...}
    public void stop( ) throws discontinuationException{...}
    public void shuffle( ) {...}
}
```

Consider also the following snippet of application source code:

```
...
[36] AudioDevice myStereo = new MP3Player( );
[37] myStereo.play( );
...
[52] myStereo.stop( );
...
```

As shown in the example, the instantiation of the AudioDevice interface requires the specification in the application source code of a concrete class that implements the interface. As a result, if a programmer later wishes to switch to alternate implementations of the AudioDevice interface, the programmer must modify the application source code itself to change the concrete class implementation of the interface. For example, if a new MP3 PDA combination device is to be utilized, a new concrete class for the MP3 PDA combination device must be provided and the application source code must be modified as follows to implement the AudioDevice interface using the new MP3PDA concrete class:

[36] AudioDevice myStereo=new MP3PDA( );

Even a single application source code change, such as the one above, still requires new development of application source code and a recompilation of the application source code. Such development and recompilation takes time, effort, and resources to accomplish. This is made even more troublesome when considered in light of modern applications where there may be thousands of lines of application source code.

SUMMARY

The illustrative embodiments provide a system and method for instantiating an interface or abstract class in application code. With the mechanisms of the illustrative embodiments, an object-oriented programming language is extended such that interfaces and abstract classes can be instantiated in application code without a concrete class specified. Metadata is defined which maps each interface or abstract class instantiation in the application code to a concrete class to be used either by the compiler at build time, or the virtual machine at runtime. Once the appropriate concrete class is determined from the metadata, the class is instantiated with a conventional class loader. The metadata may be provided, for example, as a separate file, such as a markup language file, defined with a virtual machine switch, as annotations in the application code, or the like.

In one illustrative embodiment, a method for instantiating an abstract class is provided. The method may comprise providing mapping metadata for mapping an abstract class to a corresponding concrete class implementing the abstract class. The method may further comprise encountering an instantiation statement for the abstract class during processing of application code, the instantiation statement not specifying a concrete class implementing the abstract class. The method may also comprise converting the instantiation statement to specify the concrete class implementing the abstract class based on the mapping metadata. The abstract class may be an interface class. The mapping metadata may be provided as part of a mapping metadata file data structure separate from the application code.

The mapping metadata may be provided as annotations within the application code. The annotations may be provided at one of a class-level, a method-level, a declaration-level, or a package-level.

The encountering and converting operations may be performed by a compiler at build-time of the application code. Alternatively, the encountering and converting operations may be performed at runtime by a virtual machine interpreting byte code instructions.

The application code may be application source code and the mapping metadata may be provided as both annotation metadata provided in the application source code and as mapping metadata provided in a separate mapping metadata file. Conflicts between annotation metadata provided in the application source code and mapping metadata provided in a separate mapping metadata file may be resolved in favor of the mapping metadata provided in the separate mapping metadata file.

The encountering and converting operations may be performed as part of context checking by a compiler. Moreover, the converting operation may comprise checking for a concrete class mapping in a separate mapping metadata file and checking for a concrete class mapping in application source code annotations if a concrete class mapping is not found in the separate metadata file. The converting operation may be performed using a concrete class mapping found in either the separate mapping metadata file or the application source code annotation.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is a flowchart outlining an exemplary operation for binding concrete classes to interfaces and abstract classes at runtime in accordance with one illustrative embodiment.

DETAILED DESCRIPTION OF THE ILLUSTRATIVE EMBODIMENTS

The illustrative embodiments provide mechanisms for extending the functionality of object-oriented programming languages to enable the instantiation of interfaces and abstract classes in application code without having to specify a concrete class. As such, the mechanisms of the illustrative embodiments may be used to generate application code that may be implemented in distributed data processing systems, stand-alone data processing systems, and the like. Moreover, a distributed application development mechanism, in which portions of the application development mechanism are provided on different data processing devices connected by one or more communication networks, may be utilized for actually developing the application code using the mechanisms of the illustrative embodiments.

Figure 1:
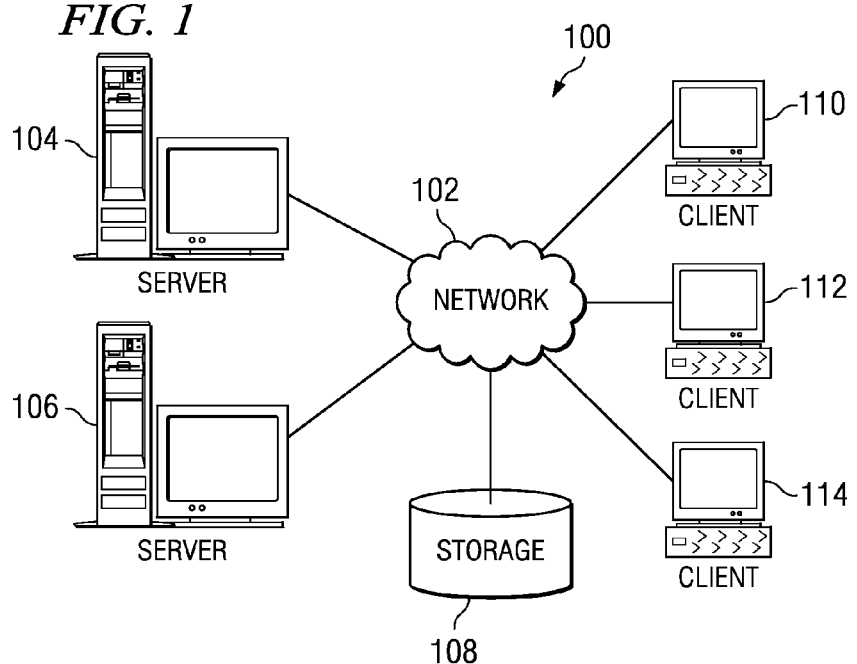
FIG. 1 is an exemplary block diagram of a distributed data processing environment in which exemplary aspects of the illustrative embodiments may be implemented.
Figure 2:
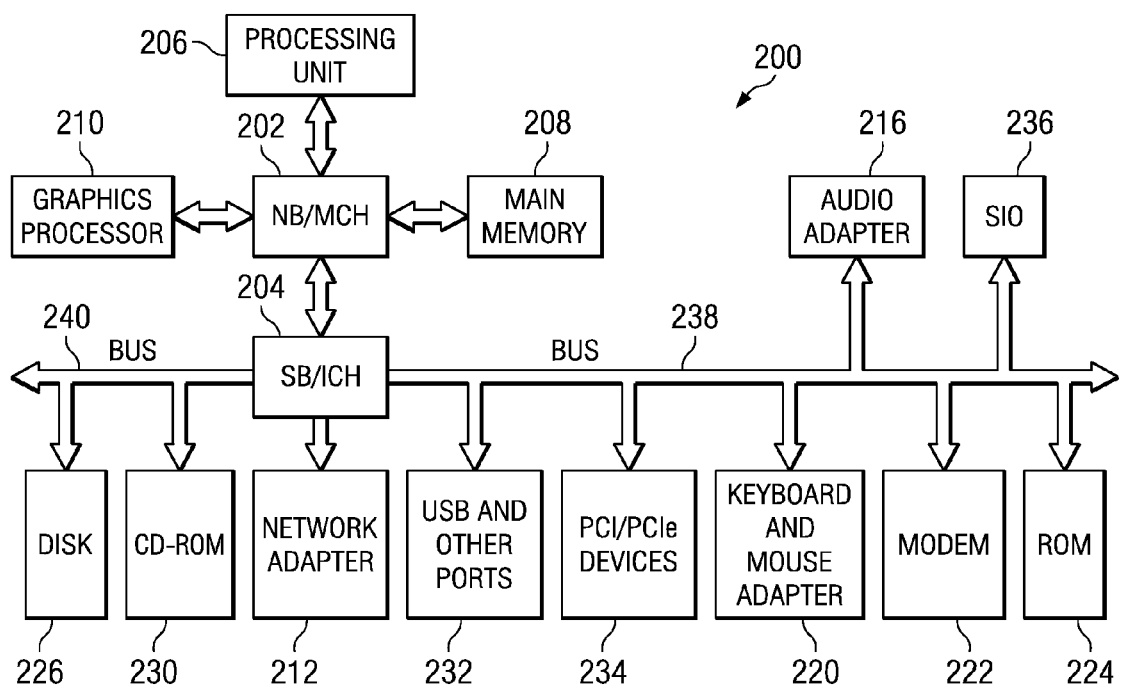
FIG. 2 is an exemplary block diagram of a data processing device in which exemplary aspects of the illustrative embodiments may be implemented.

In view of this, FIGS. 1-2 are provided hereafter as exemplary diagrams of possible data processing environments in which aspects of the illustrative embodiments may be implemented. FIGS. 1-2 are only exemplary and are not intended to state or imply any limitation with regard to the types or configurations of data processing systems in which the mechanisms of the illustrative embodiments may be implemented. Many modifications to the depicted data processing systems may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as hosts 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

The illustrative embodiments may operate on a variety of computer platforms and operating systems. In one illustrative embodiment, the computer platform provides an interpretive environment, such as a REXX, Smalltalk, Java runtime environment, or the like. For example, the illustrative embodiments may operate in conjunction with a Java Virtual Machine (JVM) yet within the boundaries of a JVM as defined by Java standard specifications. While the following description of the illustrative embodiments will assume implementations using the Java object-oriented programming language, the illustrative embodiments and the present invention are not limited to such. Rather, the mechanisms of the illustrative embodiments and present invention are applicable to any object-oriented programming language that may be presently available or later developed.

In order to provide a context for the description of the illustrative embodiments herein, an exemplary interpretive environment in which the illustrative embodiments are employed will be assumed to be a Java interpretive environment. Thus, the following description provides an explanation of portions of the operation of a JVM according to Java specifications.

Figure 3:
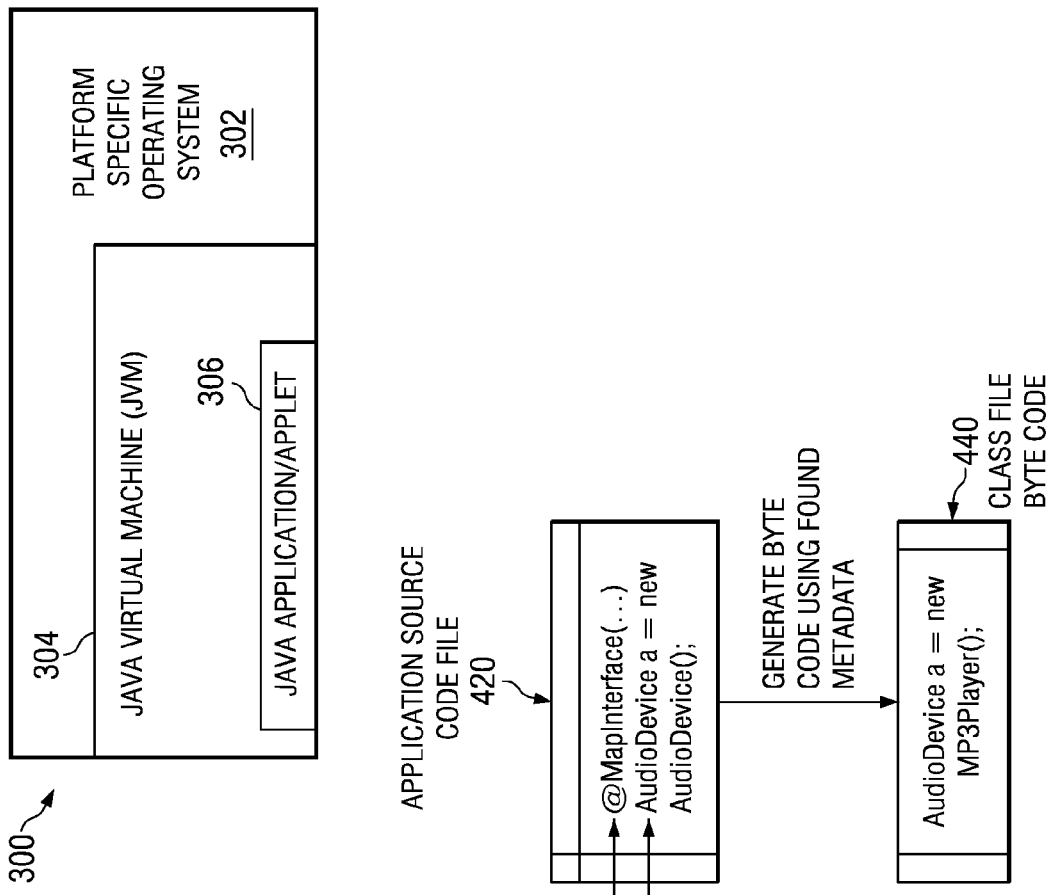
FIG. 3 is an exemplary block diagram illustrating a relationship of software components operating within a computer system that may implement the illustrative embodiments.

With reference now to FIG. 3, a block diagram illustrates the relationship of software components operating within a computer system that may implement the illustrative embodiments. Java-based system 300 contains platform specific operating system 302 that provides hardware and system support to software executing on a specific hardware platform. JVM 304 is one software application that may execute in conjunction with the operating system. Alternatively, JVM 304 may be embedded inside a Java enabled browser application such as Microsoft Internet Explorer™ or Netscape Communicator™ JVM 304 provides a Java run-time environment with the ability to execute Java application or applet 306, which is a program, servlet, or software component written in the Java programming language. The computer system in which JVM 304 operates may be similar to data processing system 200 or computer 100 described above. However, JVM 304 may be implemented in dedicated hardware on a so-called Java chip, Java-on-silicon, or Java processor with an embedded picoJava core. At the center of a Java run-time environment is the JVM 304, which supports all aspects of Java's environment, including its architecture, security features, mobility across networks, and platform independence.

The JVM 304 is a virtual computer, i.e. a computer that is specified abstractly. The specification defines certain features that every JVM must implement, with some range of design choices that may depend upon the platform on which the JVM is designed to execute. For example, all JVMs must execute Java bytecodes and may use a range of techniques to execute the instructions represented by the bytecodes. A JVM may be implemented completely in software or somewhat in hardware. This flexibility allows different JVMs to be designed for mainframe computers and PDAs.

The JVM 304 is the virtual computer component that actually executes Java programs. Java programs are not run directly by the central processor but instead by the JVM 304, which is itself a piece of software running on the processor. The JVM 304 allows Java programs to be executed on a different platform as opposed to only the one platform for which the code was compiled. Java programs are compiled for the JVM 304. In this manner, Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run-time system.

The Java compiler generates bytecode instructions that are nonspecific to a particular computer architecture. A bytecode is a machine independent code generated by the Java compiler and executed by a Java interpreter. A Java interpreter is part of the JVM that alternately decodes and interprets a bytecode or bytecodes. These bytecode instructions are designed to be easy to interpret on any computer and easily translated on the fly into native machine code.

The JVM 304 must load class files and execute the bytecodes within them. The JVM 304 contains a class loader, which loads class files from an application and the class files from the Java application programming interfaces (APIs) which are needed by the application. The execution engine that executes the bytecodes may vary across platforms and implementations. The execution engine may also be implemented in hardware and embedded on a chip so that the Java bytecodes are executed natively. JVMs usually interpret bytecodes, but JVMs may also use other techniques, such as just-in-time compiling, to execute bytecodes.

When an application is executed on a JVM 304 that is implemented in software on a platform-specific operating system, a Java application may interact with the host operating system by invoking native methods. A Java method is written in the Java language, compiled to bytecodes, and stored in class files. A native method is written in some other language and compiled to the native machine code of a particular processor. Native methods are stored in a dynamically linked library whose exact form is platform specific.

With the above computing environment, the illustrative embodiments provide mechanisms for defining implementations of interfaces and/or abstract classes without having to hard-code the implementations with a particular concrete class. Implementations of interfaces and abstract classes may be specified in the application source code with regard to a generic object instantiation. For example, an instantiation statement may be:

AudioDevice myStereo=new AudioDevice( )

where "AudioDevice" is the interface, "myStereo" is an instance variable, and "new AudioDevice( )" is a generic object instantiation.

Metadata specifying mappings of the generic class specified in the interface or abstract class implementation statements to specific concrete classes may be made using a separate file or annotations provided in the application source code. These mappings may be utilized at build time to generate bytecode as if the original implementation statements specified a concrete class. Alternatively, these mappings may be used to bind specific concrete classes to interfaces or abstract classes at runtime.

In one illustrative embodiment, the metadata for mapping of a generic class specified in implementation statements may be provided as annotations in the actual application source code. The term "annotation," in the context of the present description, means metadata appended to the source code of an attribute, method, class, or package, that can be used by the program itself, a compiler, or a virtual machine in processing the source code. The metadata may be provided at various levels of the application source code including at a class or method level, at a declaration level, or at a package level. Consider the following example for an AudioDevice interface:

```
@MapInterface (class = org.audio.device.Radio)
class AudioApplication {
    ...
    AudioDevice myStereo = new AudioDevice( );
    ...
}
```

In this example, the metadata "@MapInterface (class=org.audo.device.Radio)" is provided at a class level. At this level, all statements in the "AudioApplication" class that instantiate the AudioDevice interface will use the "org.audio.device.Radio" concrete class. Thus, by specifying the mapping metadata at a class level, one can apply the mapping to all statements the class that instantiate the corresponding interface.

The following is an example in which the mapping metadata is provided at a method level:

```
Class AudioApplication {
    @MapInterface (class = org.audio.device.MP3Player)
    void initStereo( ) {
        AudioDevice myStereo = new AudioDevice( );
        ...
    }
}
```

In this example, the mapping metadata that maps a concrete class to a particular interface is provided within the "AudioApplication" class definition. As such, the mapping metadata is applied to a method associated with that mapping metadata. For example, in the above example, the mapping metadata is associated with the method immediately following it in the class definition. At compile time, the annotation actually becomes part of the method immediately following the annotation. The compiler or virtual machine uses an annotation reflection application program interface (API) to extract the annotation information from the method and then inserts concrete classes as necessary within the method scope.

The mapping metadata may further be provided at a declaration level, as illustrated in the following example:

```
Class AudioApplication {
    void initStereo( ) {
        @MapInterface (class = org.audio.device.MP3PDA)
        AudioDevice myStereo = new AudioDevice( );
        ...
    }
}
```

At the declaration level, it is likely to be more convenient to simply hard code the implementation class as part of the "new" statement. However, in order to provide completeness of the present description it is important to illustrate that the mechanisms of the illustrative embodiments may be utilized at the declaration level if desired.

In addition to the above, the mapping metadata may also be provided at a package level, i.e. in association with a Java package that identifies classes that are part of the same namespace. At the package level, a standard "package-info.java" class within a Java package may be specified for example, in accordance with Java SE 5.0. Within this package-info.java class, the mapping metadata may be provided:

```
public class package-info {
    @MapInterface (class = org.audio.device.MP3Player)
}
```

As a result, the mapping metadata specified in the package-info.java class may be applied to all of the classes that are part of the same package namespace. Hence, rather than just being applicable to one class, as in the class level implementation described above, the package level specification of mapping metadata allows multiple classes to use the same interface-concrete class mapping information. With the annotation implemented mapping metadata embodiments, the package level provides a greatest scope of application of the specified mappings and thus, is likely to be the one that is most widely used in practice.

The mapping metadata may further be provided externally from the application source code, such as in a separate file that is accessible by a JVM or compiler. For example, the mapping metadata may be provided in an Extensible Markup Language (XML) file that is processed by the compiler when generating bytecode or the JVM when interpreting the application code. While an XML file will be used to describe illustrative embodiments, it should be appreciated that other types of files may be used in addition to, or in replacement of, the XML files. For example, other types of markup language files may be utilized without departing from the spirit and scope of the present invention.

The use of external files, e.g., XML files, may be made either as an alternative to annotations in the application source code or in conjunction with annotations in the application source code. In cases where both annotations and external files are utilized, one or the other may be chosen, depending upon the implementation, to override the other in cases of conflicts. For example, in one illustrative embodiment, any conflicts between annotation metadata and an XML metadata file's metadata is resolved in favor of the XML metadata file's metadata such that the XML metadata file's metadata overrides the annotation metadata. This allows for administration outside of the application source code.

With the XML metadata file, the XML metadata file's metadata may govern functionality for all application classes in a given package. Alternatively, a global XML metadata file may be defined for the entire application. For example, in one illustrative embodiment, an XML metadata file called "instantiation-map.xml" may be added to a package of compiled code for which the compiler or JVM automatically detects. A file called "global-instantiation-map.xml" may be added either as a javac compiler argument or a JVM argument which overrides all other metadata and governs the mapping of the entire application.

The following is one example of an XML metadata file that may be utilized with the illustrative embodiments:

```
<instantiation-map>
    <map scope="global">
        <entry interface="AudioDevice"
            class="org.audio.device.Radio"/>
    </map>
    <map scope="class" class="org.audio.app.AudioApplication">
        <entry interface="AudioDevice"
            class="org.audio.device.MP3Player"/>
    </map>
    <map scope="method" class="org.audio.app.AudioApplication"
        method="playRadio">
        <entry abstractClass="RadioStation"
            class="org.audio.stations.W3KM"/>
    </map>
</instantiation-map>
```

In the above example, the XML metadata file defines various scopes of mapping metadata applicability including global mappings, class-level mappings, method-level mappings, and the like. Statement level mapping is not provided in the XML metadata file but may be done using application source code annotation metadata, as previously described above, for example. Within the XML metadata file itself, more specific scoped mapping metadata entries always override wider scoped mapping metadata entries. Thus, for example, in the above example, all interfaces in the AudioApplication class are bound to the MP3Player class rather than the Radio class by virtue of this override methodology.

The mapping metadata provided by the illustrative embodiments, whether provided as annotation metadata or separate external metadata files, may be used by either a compiler at build-time or a JVM at runtime. Both uses will now be described.

With regard to the use of mapping metadata at build-time, a compiler switch, e.g., a javac compiler switch, may be used to specify that the compiler should replace all interface and abstract class instantiation statements with the proper concrete class defined in the mapping metadata. For example, a javac compiler switch such as the following may be utilized:

```
javac -cp org.audio.app;global-instantiation-map.xml
      -bindConcrete *.java
```

With such a javac compiler switch, if the javac compiler encounters an interface or abstract class instantiation statement in the application source code during its context checking operation, it searches the appropriate metadata, either or both of annotation metadata or external metadata file metadata, to determine which concrete class to bind to the interface or abstract class. The result is bytecode that is exactly the same as if the application source code had the hardcoded bindings in place in the interface and abstract class instantiation statements, as in the prior art. Thus, the same result as the prior art is obtained but with the additional flexibility of providing the concrete class bindings in metadata that may be easily modified without tedious application source code modifications.

Figure 4:
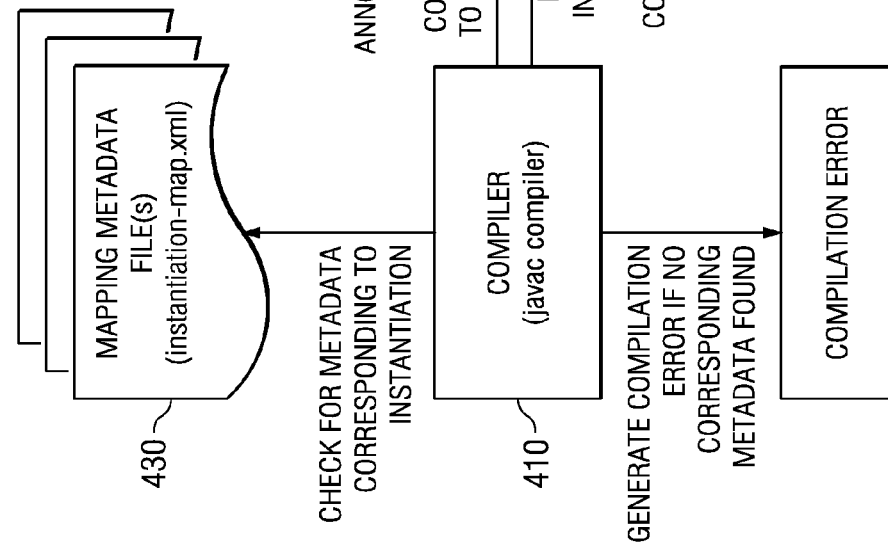
FIG. 4 is an exemplary diagram illustrating the binding of concrete classes to interfaces and abstract classes at build-time in accordance with one illustrative embodiment.

FIG. 4 is an exemplary diagram illustrating the binding of concrete classes to interfaces and abstract classes at build-time in accordance with one illustrative embodiment. As shown in FIG. 4, at build-time a compiler 410, such as a javac compiler for example, performs context checking on the application source code file 420. It is assumed for purposes of this example that the compiler 410 has an appropriate switch set to instruct the compiler 410 to replace all interface and abstract class instantiation statements with the proper concrete class defined in the mapping metadata.

As part of this context checking, the compiler 410 identifies one or more interface or abstract class instantiation statements in the application source code file 420. In response to identifying an interface or abstract class instantiation statement in the application source code file 420, the compiler 410 searches the mapping metadata file(s) 430, e.g., XML metadata file(s), for any concrete class mapping metadata for the interface or abstract class. If no mapping metadata is found in the mapping metadata file(s) 430, the compiler 410 searches the application source code file 420 for any defined mapping metadata annotations.

If the proper mapping metadata is not found by the compiler 410 in the annotations, then a compilation error may be generated and output. If the compiler 410 finds proper mapping metadata in either the mapping metadata file(s) 430 or the annotations in the application source code file 420, the compiler 410 generates byte code 440 using the corresponding concrete class specified in the found mapping metadata. The resulting byte code 440 is the same as if the concrete class were specified in a hard-coded manner as the implementation class in the application source code's implementation statement.

In order to provide additional functionality in the compiler 410, a static analysis dependency tool 412 may be provided as part of the compiler 410. This tool serves to perform static analysis on the additional dependencies of the mapping metadata and various concrete classes for the application. The static analysis dependency tool 412 may be run by the compiler 410 on the application source code file 420 to determine if all dependencies of the mapping metadata and the concrete classes are met or if there are dependencies that are not met. This tool 412 may be run by the compiler 410 as a preliminary step in the context checking before performing the operations outlined above to replace interface and abstract class instantiation statements with concrete class mappings.

The static analysis dependency tool 412 may determine if dependencies are met or not met by scanning through each class looking for instantiation statements. The mapping metadata file(s) and annotation information may be loaded into a running lookup table. If an instantiation statement is found that does not have a corresponding mapping in the lookup table, this is reported to the user with valuable information such as the package, class, line number, and interface of the instantiation statement.

For example, if all dependencies are met, the static analysis dependency tool 412 may return a statement such as:

Interface and abstract class verification complete.

All dependencies are met.

Alternatively, if a dependency is not met, the static analysis dependency tool 412 may return useful information about the dependencies that are not met, such as follows:

Interface dependencies not met:

```
Java Interface: org.audio.device.AudioDevice
[Line 36] org.audio.app.AudioApplication.java
AudioDevice myStereo = new AudioDevice( );
```

Abstract class verification complete.

Not all dependencies are met.

It should be appreciated that while the above description assumes that the compiler 410 performs the modification of interface and abstract class instantiation statements in the application source code file 420 as part of its context checking, the illustrative embodiments are not limited to such. Rather, the modification of interface and abstract class instantiation statements may be performed by a pre-compiler utility (not shown) that operates prior to the compiler 410 operating on the application source code file 420. In this way, the compiler's operation need not be modified from prior art compilers since the application source code is modified to be essentially the same as if the concrete classes were hard coded in the original instantiation statements of the application source code.

In addition to utilizing the mechanisms of the illustrative embodiments at build-time, the illustrative embodiments may be employed at runtime by allowing the virtual machine, e.g., a Java Virtual Machine (JVM), to bind implementation concrete classes at runtime. With such an embodiment, when an abstract class or interface class is encountered at runtime, the JVM may use the mapping metadata information to determine which class should be loaded. The JVM may then utilize class loaders, such as a bootstrap class loader, to load the class specified in the metadata. Subclasses of "ClassNotFoundException" called "InterfaceInstantiationException" and "AbstractClassInstantiationException" may be thrown if the metadata does not provide the appropriate implementation class.

Similar to the build-time implementation, a JVM switch may be used to inform the JVM that it can instantiate abstract classes and interfaces using the mapping metadata of the illustrative embodiments. For example, the JVM switch may take the following form:

```
java -bindConcrete -cp org.audio.bin;global-
        instantiation-map.xml AudioApplication
```

Figure 5:
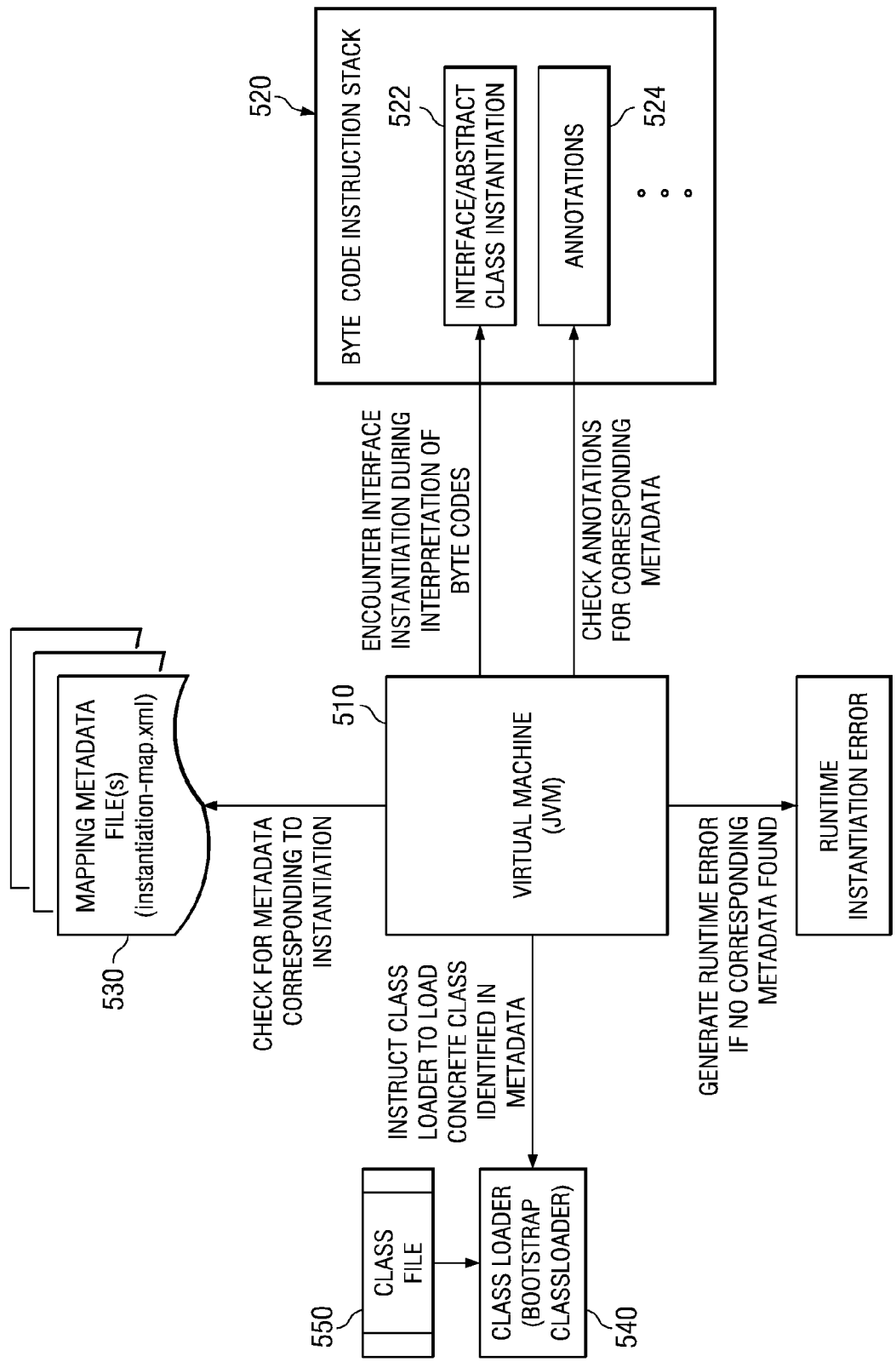
FIG. 5 is an exemplary diagram illustrating the binding of concrete classes to interfaces and abstract classes at runtime in accordance with one illustrative embodiment.

FIG. 5 is an exemplary diagram illustrating the binding of concrete classes to interfaces and abstract classes at runtime in accordance with one illustrative embodiment. As shown in FIG. 5, when the JVM 510 encounters an interface or abstract class instantiation 522 in the bytecode instruction stack 520 during runtime, the JVM searches the mapping metadata file(s) 530, e.g., XML metadata file, for mapping information matching the instantiation statement 522. If no mapping metadata is found in the mapping metadata file(s) 530, the JVM 510 searches the annotations 524 in the byte code instruction stack 520.

If proper mapping information is not found in the annotations 524, a runtime exception is thrown. If a proper mapping is found in either the mapping metadata file(s) 530 or the annotations 524, the JVM 510 uses a class loader 540, in a conventional manner, to load the concrete class 550 specified in the mapping metadata information found by the JVM 510.

At startup, the default behavior of the JVM 510 is to do "lazy loading" of XML mapping information from the mapping metadata file(s) 530 into memory where it is cached for future use. How much memory is allocated for the in-memory mapping metadata is chosen by the JVM 510 provider. However, the amount of memory may be set with "-bindConcreteSize."

In addition, two more options are available when XML metadata is used: "-bindConcrete greedy" and "-bindConcrete minimal." The "greedy" strategy parses all the XML information (package-level and global) at JVM 510 startup. If there is not enough memory available, caching is conducted as in the "lazy loading" strategy described above. The "minimal" strategy conserves as much memory as possible by parsing the XML metadata each time it is required. Thus, no mapping metadata information is cached. It should be noted that the annotation metadata may use a "@Retention (RUNTIME)" meta-annotation in order for the mapping metadata to be "visible" to the JVM 510 at runtime, as specified in the Java SE 5.0 specification.

For concrete classes to be bound at runtime, the compiler is given valid syntax for there to be runtime code in the first place. A pre-compiler utility may be provided that is run on the application source code and which replaces the interface and abstract class instantiation statements with a placeholder class. One approach is for the pre-compiler utility to create an empty class with the current time as the name:

```
public class MyInterface__113529609327 extends
    MyInterface{ }
public class AudioDevice__113529609327 extends
    AudioDevice{ }
```

The pre-compiler utility may then replace statements as follows:

```
MyInterface mi = new MyInterface( ); MyInterface mi = new
MyInterface__113529609327( );
```

At runtime, class-level "BindConcrete" annotations serve as callbacks to replace the placeholder class with the correct concrete class using the appropriate metadata. For example, the source code may look like:

```
@BindConcrete
public class AudioApplication {
    ...
    Interface AudioDevice = new AudioDevice( );
    ...
    Interface AudioDevice = new AudioDevice( );
    ...
}
```

Figure 6:
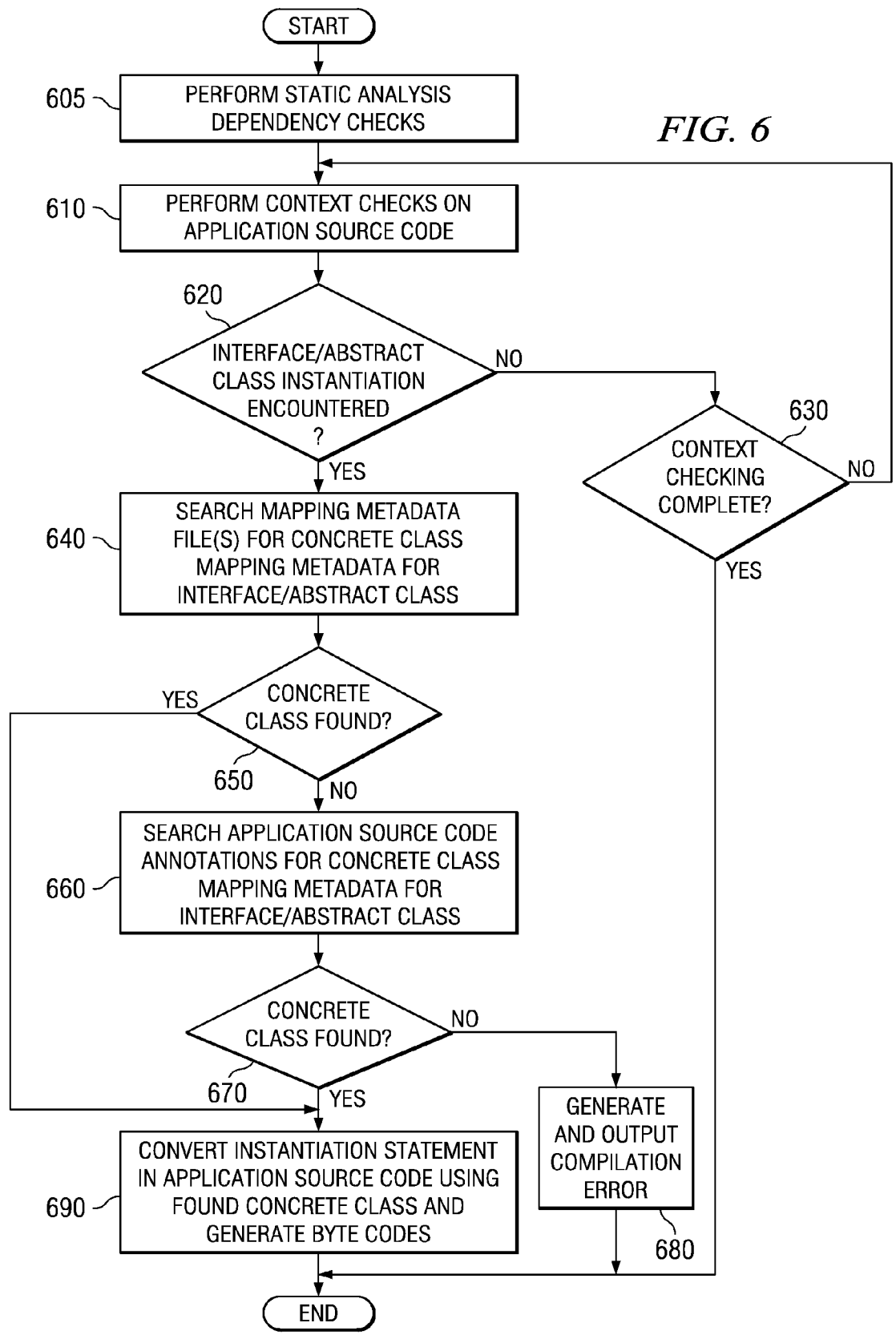
FIG. 6 is a flowchart outlining an exemplary operation for binding concrete classes to interfaces and abstract classes at build-time in accordance with one illustrative embodiment.

FIGS. 6 and 7 outline exemplary operations of the illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 6 is a flowchart outlining an exemplary operation for binding concrete classes to interfaces and abstract classes at build-time in accordance with one illustrative embodiment. As shown in FIG. 6, the operation starts with the compiler performs static analysis dependency checks on the application source code (step 605). The compiler then performs context checking on the application source code file (step 610). It is assumed for purposes of this example operation that the compiler has an appropriate switch set to instruct the compiler to replace all interface and abstract class instantiation statements with the proper concrete class defined in the mapping metadata.

As part of the context checking, the compiler determines if an interface or abstract class instantiation is encountered (step 620). If not, a determination is made as to whether the context checking has completed (step 630). If the context checking has completed, the operation terminates. If context checking has not completed, the operation returns to step 610.

If an interface or abstract class instantiation is encountered, the compiler searches one or more mapping metadata file(s), e.g., XML metadata file(s), for any concrete class mapping metadata for the interface or abstract class (step 640). The compiler determines if concrete class mapping metadata is found for the interface or abstract class (step 650). If no mapping metadata is found in the mapping metadata file(s), the compiler searches the application source code file for any defined mapping metadata annotations (step 660).

The compiler determines if proper mapping metadata for the interface or abstract class is found in the annotations (step 670). If proper mapping metadata is not found by the compiler in the annotations, then the compiler generates and outputs a compilation error (step 680). If the compiler finds proper mapping metadata in either the mapping metadata file(s) or the annotations in the application source code file, the compiler generates byte code using the corresponding concrete class specified in the found mapping metadata (step 690). The resulting byte code is the same as if the concrete class were specified in a hard-coded manner as the implementation class in the application source code's implementation statement. The operation then terminates.

FIG. 7 is a flowchart outlining an exemplary operation for binding concrete classes to interfaces and abstract classes at runtime in accordance with one illustrative embodiment. As shown in FIG. 7, the operation starts with the virtual machine encountering an interface or abstract class instantiation in the byte code instruction stack of an application (step 710). The virtual machine then searches a mapping metadata file for any mapping metadata matching the interface or abstract class instantiation (step 720).

The virtual machine determines if such mapping metadata is found (step 730). If mapping metadata is not found for the interface or abstract class instantiation, the virtual machine searches the byte code instruction stack for any annotations specifying mapping metadata for the interface of abstract class instantiation (step 740). The virtual machine determines if appropriate mapping metadata is present in the annotations (step 750). If not, a runtime exception is thrown (step 760). If proper mapping metadata is found in either the mapping metadata file of the annotations, the virtual machine instructs a class loader to load the corresponding concrete class found in the mapping metadata (step 770). The runtime execution of the application byte code is then continued in a normal manner by the virtual machine (step 780) and the operation terminates. It should be appreciated that the operation of FIG. 7 may be repeated each time an interface or abstract class instantiation is encountered during runtime in the byte code instruction stack.

Thus, the mechanisms of the illustrative embodiments allow for instantiating an interface or abstract class in application code without having to hard code the binding of the interface or abstract class to a particular implementing concrete class in the instantiation statement. To the contrary, the concrete class may be specified using mapping metadata provided as either annotations in the application source code, in a separate metadata file, or both.

The mechanisms of the illustrative embodiments may be used for various purposes with the benefits of the illustrative embodiments being apparent to those who develop application source code using object-oriented programming languages. One example of a use for the mechanisms of the illustrative embodiments is in performance testing. Performance testing often seeks to target specific components of an application. Take for example, a performance test that seeks to compare a Java Database Connectivity (JDBC) backend of a J2EE application to an Enterprise Java Bean (EJB) entity bean backend. A natural approach would be to write an interface for which both backend implementations must conform. In this way, both implementations share the same presentation layer, business logic, transaction services, etc. The illustrative embodiments may be utilized to switch between which implementation is used to instantiation the interface and thereby, compare the two implementations.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for instantiating an abstract class, comprising:

providing mapping metadata for mapping an abstract class to a corresponding concrete class implementing the abstract class;

encountering an instantiation statement for the abstract class during processing of application code, wherein the instantiation statement does not specify a concrete class implementing the abstract class; and converting the instantiation statement to specify the concrete class implementing the abstract class based on the mapping metadata.

2. The method of claim 1, wherein the abstract class is an interface class.

3. The method of claim 1, wherein the mapping metadata is provided as part of a mapping metadata file data structure separate from the application code.

4. The method of claim 1, wherein the mapping metadata is provided as annotations within the application code.

5. The method of claim 4, wherein the annotations are provided at one of a class-level, a method-level, a declaration-level, or a package-level.

6. The method of claim 5, wherein an annotation provided at a class-level is applied to all statements in the class, an annotation provided at a method-level is applied to only an associated method, an annotation provided at a package-level is applied to all classes in the package, and wherein annotations at a lower level of abstraction supersede annotations at a higher level of abstraction.

7. The method of claim 1, wherein the encountering and converting operations are performed by a compiler at build-time of the application code.

8. The method of claim 7, wherein the application code comprises a compiler switch indicating that all abstract class instantiation statements in the application code are to be converted to specify corresponding concrete classes using the mapping metadata when compiling the application code.

9. The method of claim 1, wherein the encountering and converting operations are performed at runtime by a virtual machine interpreting byte code instructions.

10. The method of claim 1, wherein the application code is application source code, and wherein the mapping metadata is provided as both annotation metadata provided in application source code and as mapping metadata provided in a separate mapping metadata file.

11. The method of claim 10, wherein conflicts between annotation metadata provided in the application source code and mapping metadata provided in a separate mapping metadata file are resolved in favor of the mapping metadata provided in the separate mapping metadata file.

12. The method of claim 1, wherein the encountering and converting operations are performed as part of context checking by a compiler, and wherein the converting operation comprises:
checking for a concrete class mapping in a separate mapping metadata file;
checking for a concrete class mapping in application source code annotations if a concrete class mapping is not found in the separate metadata file; and
performing the converting operation using a concrete class mapping found in either the separate mapping metadata file or the application source code annotation.

13. The method of claim 1, wherein the instantiation statement for the abstract class specifies an implementation of the abstract class as a generic object instantiation, and wherein the mapping metadata maps the generic object instantiation to a concrete class.

14. The method of claim 1, further comprising performing static analysis on classes in the application code, wherein the static analysis comprises:
scanning through classes in the application code to identify instantiation statements;
determining if there is mapping metadata for each identified instantiation statement in either a mapping metadata file or an annotation in the application code; and
in response to an identified instantiation statement not having corresponding mapping metadata, reporting information regarding at least one of the package, class, code line number, and interface of the instantiation statement in an error notification identifying a dependency violation.

15. A computer program product comprising a non-transitory computer useable medium having a computer readable program, wherein the computer readable program, when executed on a computing device, causes the computing device to:
provide mapping metadata for mapping an abstract class to a corresponding concrete class implementing the abstract class;
encounter an instantiation statement for the abstract class during processing of application code, wherein the instantiation statement does not specify a concrete class implementing the abstract class; and
convert the instantiation statement to specify the concrete class implementing the abstract class based on the mapping metadata.

16. The computer program product of claim 15, wherein the abstract class is an interface class.

17. The computer program product of claim 15, wherein the mapping metadata is provided as part of a mapping metadata file data structure separate from the application code.

18. The computer program product of claim 15, wherein the mapping metadata is provided as annotations within the application code.

19. The computer program product of claim 18, wherein the annotations are provided at one of a class-level, a method-level, a declaration-level, or a package-level.

20. The computer program product of claim 15, wherein the computer readable program causes the encountering and converting operations to be performed by a compiler at build-time of the application code.

21. The computer program product of claim 15, wherein the computer readable program causes the encountering and converting operations to be performed at runtime by a virtual machine interpreting byte code instructions.

22. The computer program product of claim 15, wherein the application code is application source code, and wherein the mapping metadata is provided as both annotation metadata provided in application source code and as mapping metadata provided in a separate mapping metadata file.

23. The computer program product of claim 22, wherein conflicts between annotation metadata provided in the application source code and mapping metadata provided in a separate mapping metadata file are resolved in favor of the mapping metadata provided in the separate mapping metadata file.

24. A system, comprising:
a processor; and
a memory coupled to the processor, wherein the memory comprises instructions which, when executed by the processor, cause the processor to:
provide mapping metadata for mapping an abstract class to a corresponding concrete class implementing the abstract class;
encounter an instantiation statement for the abstract class during processing of application code, wherein the instantiation statement does not specify a concrete class implementing the abstract class; and
convert the instantiation statement to specify the concrete class implementing the abstract class based on the mapping metadata.

* * * * *